(12) United States Patent
Oh et al.

(10) Patent No.: US 11,692,279 B2
(45) Date of Patent: Jul. 4, 2023

(54) COPPER NANOWIRE GROWN SHAPE-MEMORY-ALLOY, ARTIFICIAL MUSCLE INCLUDING THE SAME, AND MANUFACTURING METHOD THEREOF

(71) Applicant: KOREA ADVANCED INSTITUTE OF SCIENCE AND TECHNOLOGY, Daejeon (KR)

(72) Inventors: Il-Kwon Oh, Daejeon (KR); Saewoong Oh, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 17/746,134

(22) Filed: May 17, 2022

(65) Prior Publication Data

US 2022/0380925 A1    Dec. 1, 2022

(30) Foreign Application Priority Data

May 25, 2021 (KR) .................. 10-2021-0066787

(51) Int. Cl.
| | | |
|---|---|---|
| *C25D 5/48* | (2006.01) | |
| *C25D 3/38* | (2006.01) | |
| *C25D 5/34* | (2006.01) | |
| *B82Y 30/00* | (2011.01) | |
| *C01G 3/02* | (2006.01) | |
| *C23G 1/00* | (2006.01) | |
| *B82Y 40/00* | (2011.01) | |

(52) U.S. Cl.
CPC ............. *C25D 5/48* (2013.01); *B82Y 30/00* (2013.01); *B82Y 40/00* (2013.01); *C01G 3/02* (2013.01); *C23G 1/00* (2013.01); *C25D 3/38* (2013.01); *C25D 5/34* (2013.01)

(58) Field of Classification Search
None
See application file for complete search history.

(56) References Cited

FOREIGN PATENT DOCUMENTS

| | | | |
|---|---|---|---|
| JP | 2020-153006 | | 9/2020 |
| KR | 10-2017-0056104 | | 5/2017 |
| KR | 20170056104 A | * | 5/2017 |
| KR | 10-1868265 | | 6/2018 |
| KR | 10-2063730 | | 1/2020 |
| KR | 10-2021-0006216 | | 1/2021 |

OTHER PUBLICATIONS

Bayat et al. Surface & Coatings Technology 206 '2012' 4075-4078 (Year: 2012).*
Ma et al. Phys. Chem. Chem. Phys., 2015, 17, 20861 (Year: 2015).*
Lee et al. KR 20170056104 A, machine translation (Year: 2017).*
(Continued)

*Primary Examiner* — Wojciech Haske
(74) *Attorney, Agent, or Firm* — Lex IP Meister, PLLC

(57) ABSTRACT

An exemplary embodiment relates to improving a driving speed of a shape-memory-alloy applied as an artificial muscle, and to improving heat conduction and thermal convection by growing copper nanowires on the surface of the shape-memory-alloy to improve a natural cooling rate and a driving speed of the shape-memory-alloy.

17 Claims, 3 Drawing Sheets

(56) References Cited

OTHER PUBLICATIONS

Anupam Pathak et al., "Carbon Nanotube (CNT) fins for the enhanced cooling of shape memory alloy wire", 3. Behavior and Mechanics of Multifunctional and Composite Materials 2008, edited by Marcelo J. Dapino, Zoubeida Ounaies, Proc. of SPIE vol. 6929, 69291K, (2008).
Conghua Lu et al., "Simple Template-Free Solution Route for the Controlled Synthesis of Cu(OH)2 and CuO Nanostructures", J. Phys. Chem. B 2004, 108, 17825-17831, Oct. 21, 2004.
Darko Grujicic et al., "Electrodeposition of copper: the nucleation mechanisms", Electrochimica Acta 47 (2002) 2901-2912.
Saewoong Oh et al., "High-Frequency Torsional Wave Generation by a Magnetostrictive Patch Transducer" Proceedings of the 2021 Spring Conference of the Korean Society of Mechanical Engineers in the field of dynamics and control, KSME-DC21-Wed-13, Apr. 2021, pp. 35-36.
Sahanaz Parvin et al., "An earth-abundant bimetallic catalyst coated metallic nanowire grown electrode with platinum-like pH-universal hydrogen evolution activity at high current density." Chemical science 11.15 (Mar. 24, 2020) 3893-3902.
N. Bayat et al., "Growth of copper nanowire arrays on NiTi shape memory alloy thin film" Surface and Coatings Technology 206.19-20 (Apr. 9, 2012): 4075-4078.

\* cited by examiner

COPPER NANOWIRE GROWN SHAPE-MEMORY-ALLOY, ARTIFICIAL MUSCLE INCLUDING THE SAME, AND MANUFACTURING METHOD THEREOF

CROSS-REFERENCE TO RELATED APPLICATION

This application claims priority to and the benefit of Korean Patent Application No. 10-2021-0066787 filed in the Korean Intellectual Property Office on May 25, 2021, the entire contents of which are incorporated herein by reference.

BACKGROUND OF THE INVENTION

(a) Field of the Invention

A copper nanowire shape-memory-alloy, an artificial muscle including the same, and a manufacturing method thereof are provided.

(b) Description of the Related Art

Artificial muscles that have a quiet, soft, and free shape and may generate a great force replaces the conventional motor or hydraulic-based actuator to be used as actuators in many robot fields, such as walking robots, service robots, health assistance robots, and wearable robots, and thus, the demand for the artificial muscles is increasing. A shape-memory-alloy (hereinafter, SMA) used in the artificial muscles may be driven through heating and cooling. For example, when the shape-memory-alloy is cooled, the shape of the shape-memory-alloy may be deformed into a desired shape, and when the shape-memory-alloy is heated, the shape-memory-alloy may return to the memorized shape before being deformed. However, although the shape-memory-alloy-based artificial muscle has the advantage that it may generate a large force or large deformation, the shape-memory-alloy generally has a disadvantage in that a driving speed according to a change in temperature is slow.

A method of heating a shape-memory-alloy includes a Joule heating method through a flow of high-temperature fluid or a flow of current, and a method of cooling a shape-memory-alloy includes a natural cooling method through natural convection or a forced cooling method through a flow of fluid. In this case, a driving speed of the shape-memory-alloy is limited due to cooling which is significantly slower than heating. Therefore, in order to improve the driving speed of the shape-memory-alloy, conventionally, the flow of fluid from a separate motor or an air pump is added to forcibly cool the shape-memory-alloy. However, there is a disadvantage in that a heavy and bulky motor or air pump needs to be included when driving.

The above information disclosed in this Background section is only for enhancement of understanding of the background of the invention, and therefore it may contain information that does not form the prior art that is already known in this country to a person of ordinary skill in the art.

SUMMARY OF THE INVENTION

An exemplary embodiment has been made in an effort to provide a copper nanowire shape-memory-alloy, an artificial muscle including the same, and a manufacturing method thereof having advantages of improving a driving speed of a shape-memory-alloy by improving the cooling rate under natural convection of the shape-memory-alloy.

An exemplary embodiment has been made in an effort to provide a copper nanowire shape-memory-alloy, an artificial muscle including the same, and a manufacturing method thereof having advantages of improving a driving speed of a shape-memory-alloy by improving a cooling rate even in forced cooling of a copper nanowire grown shape-memory-alloy.

An exemplary embodiment has been made in an effort to provide a copper nanowire shape-memory-alloy, an artificial muscle including the same, and a manufacturing method thereof having advantages of growing the copper nanowire on a surface of the shape-memory-alloy at room temperature in order to prevent other shapes than an original shape memorized in the shape-memory-alloy from being memorized.

An exemplary embodiment has been made in an effort to provide a copper nanowire shape-memory-alloy, an artificial muscle including the same, and a manufacturing method thereof having advantages of growing copper nanowires on a large amount of shape-memory-alloy through a single manufacturing process.

An exemplary embodiment provides a method of growing copper nanowires on a surface of a shape-memory-alloy regardless of a thickness, a width, and a shape of the shape-memory-alloy.

An exemplary embodiment provides a method of manufacturing a copper nanowire directly grown shape-memory-alloy, including: removing an oxide film on a surface of the shape-memory-alloy; electrodepositing copper on the surface of the shape-memory-alloy; growing a copper hydroxide nanowire on the surface of the shape-memory-alloy based on the electrodeposited copper; oxidizing the copper hydroxide nanowire to a copper oxide nanowire; and reducing the copper oxide nanowire to the copper nanowire by reducing the copper oxide nanowire.

The shape-memory-alloy may have a form of a thin film, a wire, a spring, etc., and a thickness of the shape-memory-alloy may be about 0.08 mm to about 1.5 mm.

A main material for removing the oxide film on the surface of the shape-memory-alloy may include one or more of phosphoric acid ($H_3PO_4$), hydrogen peroxide ($H_2O_2$), water, etc.

A mixed ratio of phosphoric acid and hydrogen peroxide may be a mass ratio of about 5:1 to about 4:1.

A mixture of phosphoric acid, hydrogen peroxide, and water may be used at a temperature of about 80° C. to about 90° C.

A time to remove the oxide film on the surface of the shape-memory-alloy may be performed for about 40 minutes to about 60 minutes.

The main material for electrodepositing copper on the surface of the shape-memory-alloy may include one or more of copper sulfate ($CuSO_4$), sulfuric acid ($H_2SO_4$), water, etc.

A ratio of copper sulfate and sulfuric acid may be used in a molar ratio of about 1:1. For example, the copper sulfate and the sulfuric acid may be used at a concentration of 0.5 mol and 0.5 mol, respectively, in a total 1 L solution.

A three-electrode electroplating method may be used as a condition for electrodeposition of copper.

For example, in the three-electrode electroplating method, the shape-memory-alloy may be used as a working electrode, an Ag/AgCl electrode using saturated KCl as an electrolyte may be used as a reference electrode, and a copper film may be used as a counter electrode.

A thickness of the copper film used may be about 0.02 to about 0.2 mm.

An input voltage of the three-electrode electroplating method for copper electrodeposition may be about −0.5V to about −0.6V, and the time may be about 30 seconds to about 120 seconds. Based on the electrodeposited copper, the main material for growing the copper hydroxide nanowire may include one or more of ammonium persulfate $((NH_4)_2S_2O_8)$, potassium hydroxide (KOH), water, etc.

A concentration of ammonium persulfate may be about 0.05M to about 0.2M, and a concentration of potassium hydroxide may be about 2M to about 3M.

In order to grow the copper hydroxide nanowire, the copper electrodeposited shape-memory-alloy may be immersed in a mixed solution of the ammonium persulfate and the potassium hydroxide at room temperature for about 5 minutes to about 15 minutes.

A generation density of copper hydroxide nanowires according to an exemplary embodiment may be adjusted according to the time of immersing the copper electrodeposited shape-memory-alloy in the mixed solution of the ammonium persulfate and the potassium hydroxide.

The structure of the copper hydroxide nanowire according to an exemplary embodiment may be grown in a radial needle shape, a cylindrical shape, etc., around a shape-memory-alloy.

In order to oxidize the copper hydroxide nanowires grown on the surface of the shape-memory-alloy to the copper oxide nanowires, the copper hydroxide nanowire grown shape-memory-alloy may be heated in an oven at about 140° C. to about 150° C. for about 2 hours to about 3 hours.

The structure of the copper oxide nanowire according to an exemplary embodiment may be grown in a radial needle shape, a cylindrical shape, etc. around the shape-memory-alloy.

The main material used for the reducing step to the copper nanowires through the reduction of the copper oxide nanowires grown on the surface of the shape-memory-alloy may include one or more of potassium hydroxide (KOH), water, etc., and the three-electrode cyclic voltage method may be used.

The concentration of the potassium hydroxide may be about 0.15M to about 0.2M.

In the three-electrode cyclic voltage method, the copper oxide nanowire grown shape-memory-alloy may be used as a working electrode, an Ag/AgCl electrode using saturated KCl as an electrolyte may be used as a reference electrode, and a platinum electrode may be used as a counter electrode.

The cyclic voltage condition of the three-electrode cyclic voltage method may be cycled 4 to 5 times from about −2.6V to about −1.115V.

The structure of the copper nanowire according to an exemplary embodiment may be grown in the radial needle shape, the cylindrical shape, etc., around the shape-memory-alloy.

According to an exemplary embodiment, it is possible to improve thermal conductivity between a shape-memory-alloy and copper nanowires by directly growing the copper nanowire on a surface of the shape-memory-alloy.

According to an exemplary embodiment, it is possible to improve a specific surface area of a shape-memory-alloy by directly growing the copper nanowire on a surface of the shape-memory-alloy, and thus, improve thermal convection.

According to an exemplary embodiment, it is possible to maintain the previously memorized shape and directly grow copper nanowires on a surface of a shape-memory-alloy by performing a manufacturing process at about 350° C. or lower which is a temperature at which a shape is memorized.

According to an exemplary embodiment, it is possible to grow copper nanowires on about 150 or more shape-memory-alloys at a time.

According to an exemplary embodiment, it is possible to stably maintain a structure of copper nanowires directly grown on a surface of a shape-memory-alloy are used as an artificial muscle during contraction and relaxation by using the shape-memory-alloy as an artificial muscle.

According to an exemplary embodiment, it is possible to improve a driving speed compared to the conventional shape-memory-alloy in a natural convection state.

According to an exemplary embodiment, it is possible to improve a driving speed compared to the conventional shape-memory-alloy in a forced cooling state.

According to an exemplary embodiment, it is possible to apply a copper nanowire directly grown shape-memory-alloy to various engineering fields requiring a fast driving speed.

DETAILED DESCRIPTION OF THE EMBODIMENTS

Figure 1:
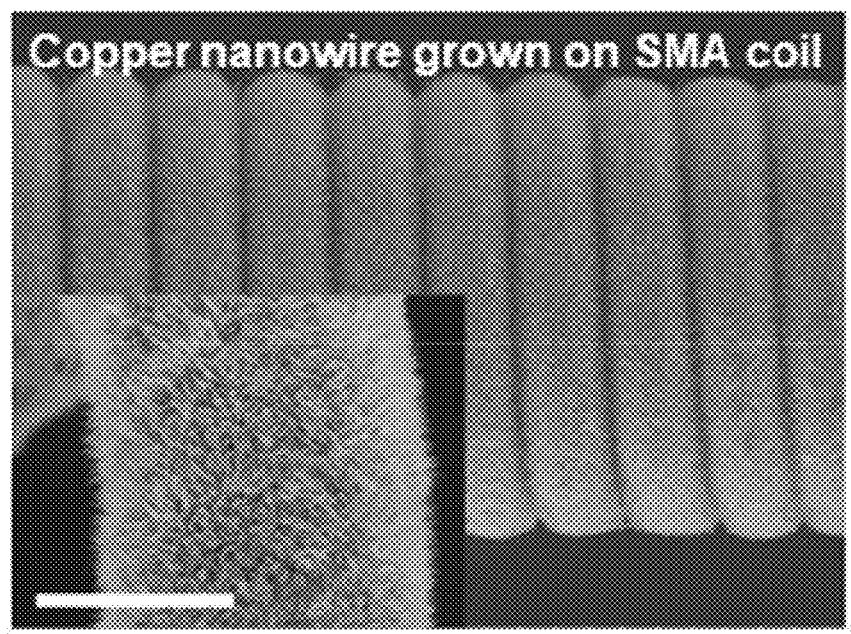
FIG. 1 is a SEM surface image of a copper nanowire directly grown shape-memory-alloy spring.

Exemplary embodiments will be described in detail with reference to the accompanying drawings so that those skilled in the art to which the present invention pertains may easily practice the present invention. As those skilled in the art would realize, the described embodiments may be modified in various different ways, all without departing from the spirit or scope of the present invention. Portions unrelated to the description in the drawings will be omitted in order to obviously describe the present invention, and similar components will be denoted by the same reference numerals throughout the present specification. In addition, in the case of a well-known known technology, a detailed description thereof will be omitted.

Throughout the specification, unless explicitly described to the contrary, the word "comprise" and variations such as "comprises" or "comprising", will be understood to imply the inclusion of stated elements but not the exclusion of any other elements.

Then, a copper nanowire grown shape-memory-alloy, an artificial muscle including the same, and a manufacturing method thereof according to an exemplary embodiment will be described in detail.

In order to improve a cooling rate and a driving speed of the shape-memory-alloy in a natural cooling state without a separate cooling device, copper nanowires are directly grown on a surface of the shape-memory-alloy according to an exemplary embodiment. Copper nanowires may smoothly conduct heat from the shape-memory-alloy to the copper nanowires based on copper with high thermal conductivity, and heat dissipation in natural convection may be accelerated by increasing a specific surface area of the shape-memory-alloy through the growth of the copper nanowires.

A method of manufacturing a copper nanowire directly grown shape-memory-alloy according to an exemplary embodiment will be described in detail.

The oxide film on the surface of the shape-memory-alloy may be immersed in a solution, in which phosphoric acid, hydrogen peroxide, and water heated to a temperature of about 80° C. to about 90° C. are mixed in a mass ratio of about 5:1:4 to about 4:1:5, for about 40 minutes to about 60 minutes, and the oxide film on the surface of the shape-memory-alloy may be most efficiently removed under these conditions.

When the oxide film on the surface of the shape-memory-alloy is removed, since the electrical conductivity of the surface of the shape-memory-alloy may be increased, copper may be smoothly plated on the surface of the shape-memory-alloy during copper electrodeposition through electroplating. In addition, since a bond between the metal and copper in the oxide film of the shape-memory-alloy is firmly formed, a copper layer having a stable structure even in mechanical deformation may be electrodeposited on the surface of the shape-memory-alloy.

In order to electrodeposit copper on the surface of the shape-memory-alloy from which the oxide film has been removed, a three-electrode electroplating method using a solution in which about 0.5M of copper sulfate ($CuSO_4$) and about 0.5M of sulfuric acid ($H_2SO_4$) are mixed in water as an electrolyte may be used.

The copper electrodeposition method through the three-electrode electroplating method may uniformly electrodeposit copper on all surfaces regardless of the curved shape or complex shape of the shape-memory-alloy. In addition, compared to gas deposition and atomic deposition, the three-electrode electroplating method may electrodeposit copper on the surface of the shape-memory-alloy in a short time. In addition, since the three-electrode electroplating method uses electricity, copper may be electrodeposited on the shape-memory-alloy so that a bonding force between metal and copper constituting the shape-memory-alloy is strong.

In the three-electrode electroplating method, the shape-memory-alloy from which the oxide film has been removed may be used as a working electrode, an Ag/AgCl electrode using saturated KCl as an electrolyte may be used as a reference electrode, and a copper film having a thickness of about 0.02 to about 0.2 mm may be used as a counter electrode. According to the three-electrode electroplating method, an input voltage is about −0.5V to about −0.6V, and a time is about 30 seconds to about 120 seconds, and copper may be electrodeposited on the surface of the shape-memory-alloy from which the oxide film has been removed. When the three-electrode electroplating method is performed under these process conditions, an electrodeposition rate of copper on the surface of the shape-memory-alloy may be improved, and the bonding force between the shape-memory-alloy and copper may increase.

Ammonium persulfate (($NH_4)_2S_2O_8$) and potassium hydroxide (KOH) may be mixed in water to grow copper hydroxide nanowires based on the copper electrodeposited on the surface of the shape-memory-alloy. A concentration of the ammonium persulfate may be about 0.05M to about 0.2M, and a concentration of the potassium hydroxide may be about 2M to about 3M, and when the concentration is in this range, copper hydroxide nanowires may be uniformly grown on the surface of the shape-memory-alloy. For example, a solution of about 0.13M of ammonium persulfate (($NH_4)_2S_2O_8$) and about 2.5M of potassium hydroxide (KOH) may be used.

In order to grow the copper hydroxide nanowire, the copper electrodeposited shape-memory-alloy is immersed in the prepared mixed solution of the ammonium persulfate and the potassium hydroxide at room temperature for about 5 minutes to about 15 minutes, so the copper hydroxide nanowires may be made to grow from electrodeposited copper.

The structure of the copper hydroxide nanowire according to an exemplary embodiment may be grown in a radial needle shape, a cylindrical shape, etc., around the shape-memory-alloy to improve the specific surface area of the shape-memory-alloy, and thus, may be advantageous to improve the cooling rate by accelerating thermal convection.

However, since the copper hydroxide has low thermal conductivity, the thermal conductivity from the shape-memory-alloy to the nanowire may decrease. Accordingly, in order to reduce the copper hydroxide to the copper having high thermal conductivity, the copper hydroxide is first oxidized to copper oxide and then reduced to copper. For example, the copper hydroxide nanowires grown on the surface of the shape-memory-alloy are heated in an oven at about 140° C. to about 150° C. for about 2 hours to about 3 hours. Through such heating, the copper hydroxide nanowires grown on the surface of the shape-memory-alloy may be oxidized to copper oxide nanowires while maintaining the intrinsic structure of the nanowires.

Next, for the reduction step to the copper nanowires through the reduction of the copper oxide nanowires grown on the surface of the shape-memory-alloy, a three-electrode cyclic voltage method using, as an electrolyte, a mixed solution in which potassium hydroxide (KOH) with a concentration of about 0.15M to about 0.2M is dissolved in water may be used.

In the three-electrode cyclic voltage method, the copper nanowire grown shape-memory-alloy may be used as a working electrode, the Ag/AgCl electrode using saturated KCl as an electrolyte may be used as a reference electrode, and the platinum electrode may be used as a counter electrode, and the cyclic voltage condition may be cycled 4 to 5 times from about −2.6V to about −1.115V to reduce the copper oxide to copper.

The reduction method using the three-electrode cyclic voltage method having these process conditions may be performed at about 25° C. to about 27° C., which is a very low temperature compared to the conventional method of reducing copper oxide to copper using hydrogen ($H_2$) gas at about 400° C. to about 1000° C., so the shape-memory-alloy may be prevented from being stored in a different shape at high temperature or the structure of the shape-memory-alloy may be prevented from collapsing. In addition, compared to the conventional high-temperature reduction method that requires about 1 hour to about 4 hours, the reduction method through the three-electrode cyclic method may be performed for about 5 minutes.

In the copper nanowire directly grown shape-memory-alloy, copper with the highest thermal conductivity among metals may be grown in the form of nanowires. In addition, the specific surface area of the shape-memory-alloy increased due to the structure of the nanowire improves the heat conduction and thermal convection of the shape-memory-alloy to increase the cooling rate compared to the conventional shape-memory-alloy, thereby increasing the driving speed when the shape-memory-alloy is used as an artificial muscle.

According to the related art, due to the slow cooling in the natural convection state of the shape-memory-alloy, a separate motor or air pump is used to induce the flow of fluid to forcibly cool the shape-memory-alloy. However, according to this related art, a heavy and bulky motor and an air pump needs to be used, and when these heavy and bulky devices are used, the advantages of the shape-memory-alloy-based artificial muscle may fade compared to the conventional motor or hydraulic-based robot.

On the other hand, according to an exemplary embodiment, by directly growing copper nanowires with high thermal conductivity on the surface of the shape-memory-alloy, heat conduction between the shape-memory-alloy and the copper nanowires may increase, and by improving the specific surface area of the shape-memory-alloy through the grown nanowire structure, it is possible to accelerate the thermal convection in the natural convection state. Through this, it is possible to improve the driving speed by showing an improved cooling rate even in the natural cooling state without a forced cooling element.

Hereinafter, the present invention will be described in more detail with reference to Examples, but the following Examples are only examples of the present invention, and the present invention is not limited thereto.

Example 1

In order to remove an oxide film on a surface of a shape-memory-alloy composed of a Ni/Ti alloy, a solution of phosphoric acid, hydrogen peroxide, and water in a mass ratio of about 5:1:4 is heated to about 85° C., and then, a shape-memory-alloy spring having a thickness of about 0.3 mm is immersed in a mixed solution for about 40 minutes.

The shape-memory-alloy spring from which the oxide film has been removed is washed with tertiary purified water for about 5 minutes.

In order to electrodeposit copper on the surface of the shape-memory-alloy, the shape-memory-alloy spring is subjected to a three-electrode electroplating method using, as an electrolyte, a solution in which copper sulfate and sulfuric acid of about 0.5 M and about 0.5 M, respectively are mixed with water.

To perform the three-electrode electroplating, the shape-memory-alloy spring is used as a working electrode, an Ag/AgCl electrode using saturated KCl as an electrolyte is used as a reference electrode, and a copper film having a thickness of about 0.1 mm is connected as a counter electrode.

With the three-electrode electroplating for copper electrodeposition, the input voltage is about −0.505V and the time is about 60 seconds to electrodeposit copper on the surface of the shape-memory-alloy.

The copper electrodeposited shape-memory-alloy spring produced through the above process is washed with tertiary purified water for about 5 minutes.

The copper electrodeposited shape-memory-alloy spring is immersed in a solution, in which about 0.13M of ammonium persulfate and about 2.5M of potassium hydroxide are mixed in water, for about 10 minutes to grow copper hydroxide nanowires based on the electrodeposited copper.

The copper hydroxide nanowire grown shape-memory-alloy spring produced through the above process is washed with tertiary purified water for about 5 minutes.

The copper hydroxide nanowire grown shape-memory-alloy is placed in an oven heated to about 150° C. for 2 hours to oxidize copper hydroxide nanowires to copper oxide nanowires, and after heating is finished, when the temperature reaches about 25° C., taken out of the oven.

Through the three-electrode cyclic voltage method using, as the electrolyte, about 0.15M of KCL concentration solution in which the copper oxide nanowires produced through the above process were mixed in water, the copper oxide nanowire is reduced to the copper nanowire.

In the three-electrode cyclic voltage method, the copper oxide nanowire grown shape-memory-alloy is used as a working electrode, the Ag/AgCl electrode using saturated KCl as an electrolyte is used as a reference electrode, and the platinum electrode is used as a counter electrode.

The copper nanowire directly grown shape-memory-alloy spring is produced by reducing the copper oxide nanowire to the copper nanowire by cycling 5 times from about −2.6V to about −1.115V under the cyclic voltage condition.

SEM Analysis

The SEM surface image of the copper nanowire directly grown shape-memory-alloy spring according to Example 1 is taken and illustrated in FIG. 1. Referring to FIG. 1, the copper nanowire has a radially pointed needle or cylindrical structure around a cylindrical shape-memory-alloy.

Temperature Change Analysis

Figure 2:
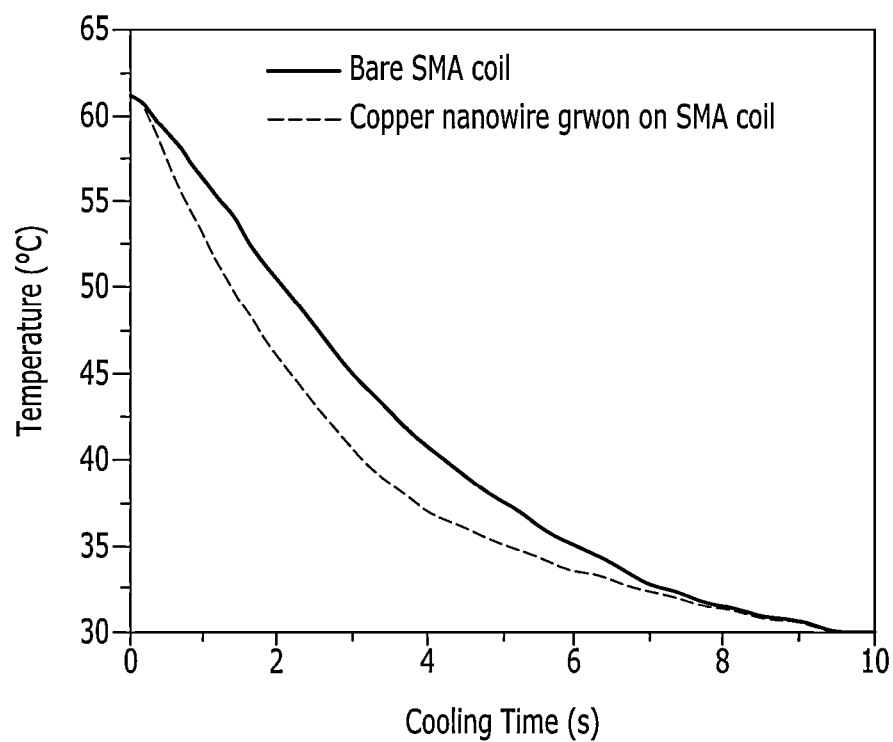
FIG. 2 is a graph showing a change in temperature over time of a copper nanowire directly grown shape-memory-alloy and a conventional shape-memory-alloy without copper nanowires.

FIG. 2 illustrates the change in temperature over time of the copper nanowire directly grown shape-memory-alloy according to the Example 1 described above and the shape-memory-alloy without the copper nanowires. Referring to FIG. 2, the shape-memory-alloy is heated to about 60° C. and then cooled to about 30° C. and it can be seen that the copper nanowire directly grown shape-memory-alloy is cooled faster than the shape-memory-alloy without copper nanowires.

Driving Speed Analysis

Figure 3:
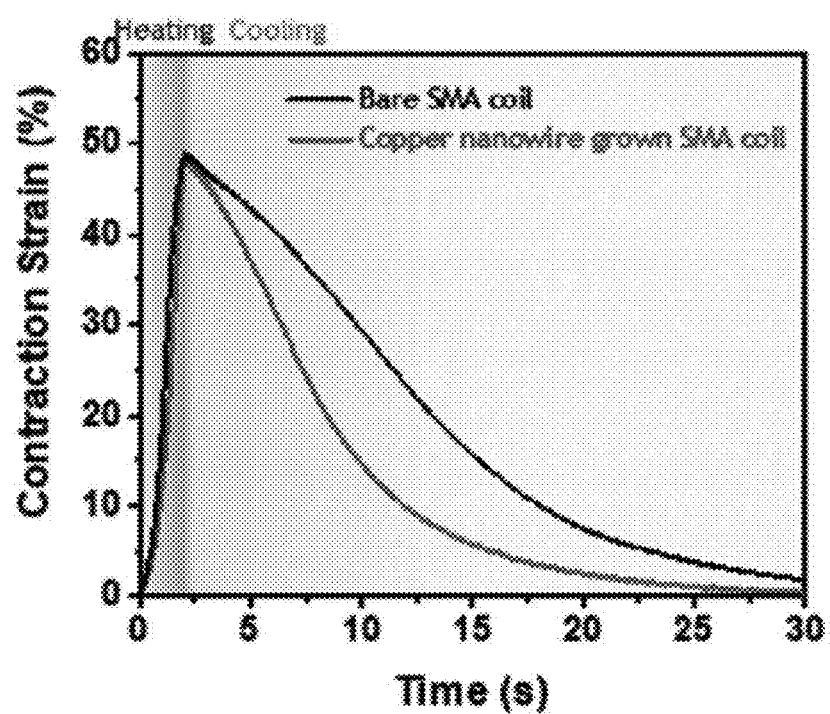
FIG. 3 is a graph of contraction and relaxation according to a change in temperature through Joule heating of a copper nanowire directly grown shape-memory-alloy spring and a shape-memory-alloy spring without copper nanowires.

FIG. 3 illustrates the process of contraction and relaxation according to the change in temperature through Joule heating of the copper nanowire directly grown shape-memory-alloy spring according to Example 1 and the shape-memory-alloy spring without the copper nanowires. A weight of about 300 g is hung on the shape-memory-alloy spring and a current of about 1.3 A is applied for about 2 seconds to contract both shape-memory-alloy springs to about 50% of the deformation. Thereafter, the time it takes for the shape-memory-alloy spring to relax to its original state after cooling in the natural convection state is compared. Referring to FIG. 3, it can be seen that the copper nanowire directly grown shape-memory-alloy is relaxed at a faster rate than the shape-memory-alloy without the copper nanowires.

Although the exemplary embodiment of the present invention has been described in detail hereinabove, the scope of the present invention is not limited thereto. That is, several modifications and alterations made by a person of ordinary skill in the art using a basic concept of the present invention as defined in the claims fall within the scope of the present invention.

What is claimed is:

1. A method of manufacturing a shape-memory-alloy, comprising:
   removing an oxide film on a surface of the shape-memory-alloy;
   electrodepositing copper on the surface of the shape-memory-alloy from which the oxide film is removed;
   growing a copper hydroxide nanowire on the surface of the copper electrodeposited shape-memory-alloy;
   oxidizing the copper hydroxide nanowire grown on the surface of the shape-memory-alloy to a copper oxide nanowire; and reducing the copper oxide nanowire grown on the surface of the shape-memory-alloy to copper nanowire, wherein a main material for removing the oxide film on the surface of the shape-memory-alloy includes phosphoric acid ($H_3PO_4$), hydrogen peroxide ($H_2O_2$), and water.

2. The method of claim 1, wherein:
a solution used to remove the oxide film on the surface of the shape-memory-alloy includes a mixed solution of phosphoric acid and hydrogen peroxide, and a mass ratio of the phosphoric acid and the hydrogen peroxide is 5:1 to 4:1.

3. The method of claim 1, wherein:
a mixed solution used to remove the oxide film on the surface of the shape-memory-alloy is used at a temperature of 80° C. to 90° C.

4. The method of claim 1, wherein:
a time to remove the oxide film on the surface of the shape-memory-alloy is 40 to 60 minutes.

5. The method of claim 1, wherein:
a main material for electrodepositing copper on the surface of the shape-memory-alloy from which the oxide film is removed includes copper sulfate ($CuSO_4$), sulfuric acid ($H_2SO_4$), and water.

6. The method of claim 5, wherein:
a solution used to electrodeposit copper on the surface of the shape-memory-alloy from which the oxide film is removed includes a mixed solution of copper sulfate and sulfuric acid, and a molar ratio of the copper sulfate and the sulfuric acid is 1:1.

7. The method of claim 5, wherein:
a three-electrode electroplating method is used as a condition for electrodepositing copper on the surface of the shape-memory-alloy from which the oxide film is removed, and in the three-electrode electroplating method, a shape-memory-alloy is used as a working electrode, an Ag/AgCl electrode using saturated KCl as an electrolyte is used as a reference electrode, and a copper film is used as a counter electrode.

8. The method of claim 7, wherein:
a thickness of the copper film used in the three-electrode electroplating method is 0.02 mm to 0.2 mm.

9. The method of claim 7, wherein:
an input voltage of the three-electrode electroplating method is −0.5V to −0.6V, and a time is 30 seconds to 120 seconds.

10. The method of claim 1, wherein:
a main material for growing the copper hydroxide nanowire on the surface of the copper electrodeposited shape-memory-alloy includes ammonium persulfate (($NH_4$)$_2S_2O_8$), potassium hydroxide (KOH), and water.

11. The method of claim 10, wherein:
ammonium persulfate and potassium hydroxide are used to grow the copper hydroxide nanowire on the surface of the copper electrodeposited shape-memory-alloy.

12. The method of claim 10, wherein:
in order to grow the copper hydroxide nanowire on the surface of the copper electrodeposited shape-memory-alloy, the copper electrodeposited shape-memory-alloy is immersed in a mixed solution of the ammonium persulfate and the potassium hydroxide at room temperature for 5 to 15 minutes.

13. The method of claim 1, wherein:
in order to oxidize the copper hydroxide nanowire grown on the surface of the shape-memory-alloy to the copper oxide nanowire, a copper hydroxide nanowire grown shape-memory-alloy is heated in an oven of 140° C. to 150° C. for 2 to 3 hours to oxidize the copper hydroxide nanowire to the copper oxide nanowire.

14. The method of claim 1, wherein:
a main material for reducing the copper oxide nanowire grown on the surface of the shape-memory-alloy to the copper nanowire includes a 0.15M to 0.2M concentration of potassium hydroxide solution mixed in water.

15. The method of claim 14, wherein:
a three-electrode cyclic voltage method is used as a method of reducing the copper oxide nanowire grown on the surface of the shape-memory-alloy to the copper nanowire.

16. The method of claim 15, wherein:
in the three-electrode cyclic voltage method, a copper oxide nanowire grown shape-memory-alloy is used as a working electrode, an Ag/AgCl electrode using saturated KCl as an electrolyte is used as a reference electrode, and a platinum electrode is used as a counter electrode.

17. The method of claim 16, wherein:
a cyclic voltage condition of the three-electrode cyclic voltage method is cycled 4 to 5 times from −2.6V to −1.115V.

* * * * *